Patented Aug. 1, 1933

1,920,242

UNITED STATES PATENT OFFICE 1,920,242

HYDROGENATION OF MONO-
VINYLACETYLENE

William S. Calcott, Penns Grove, N. J., Albert S.
Carter, Wilmington, Del., and Frederick B.
Downing, Carneys Point, N. J., assignors to E. I.
du Pont de Nemours & Company, Wilmington,
Del., a Corporation of Delaware No Drawing. Application April 24, 1931
Serial No. 532,684

20 Claims. (Cl. 260—170.)

This invention relates to the hydrogenation of acetylene polymers, and more particularly it relates to the conversion of monovinylacetylene to butadiene by a process of hydrogenation.

Prior art

Various methods have been suggested for the preparation of butadiene, but many of them have been found objectionable for various reasons and are of small value since they are not adapted for commercial utilization. Furthermore, the methods of the prior art generally require high temperatures which make the processes not only uneconomical but inefficient, due, in a large measure, to the undesirable products of decomposition of the products of the reaction which are formed in substantial quantities when high temperatures are used.

In a patent of Bolton and Downing (U. S. 1,777,600) a method is described for the preparation of butadiene from diacetylene which furnishes the product in question without the disadvantages of high temperature operation, but diacetylene is a relatively costly raw material and difficult to prepare.

It is known that, by passing acetylene into a mixture of ammonium chloride, water, cuprous chloride and copper powder in suitable proportions and under proper conditions, unsaturated hydrocarbons having molecular weights higher than acetylene are formed. These hydrocarbons comprise a liquid whose components may be separated by distillation, the components of the liquid mixture having a molecular structure corresponding to the formula $C_xH_x$. One of the components has the formula $C_6H_6$, and is called divinylacetylene. Other components of the mixture correspond to the formulæ $C_8H_8$ and $C_4H_4$. The latter named component has been identified as monovinylacetylene, and forms the starting material in the process of the present invention.

Monovinylacetylene may be cheaply and economically manufactured according to the process outlined in a pending application to Carter and Downing, Patent No. 1,876,857, filed September 1, 1928, in which high yields of monovinylacetylene are obtained with a concomitant suppression of the rate of formation of the polymers $C_6H_6$ and $C_8H_8$.

The process disclosed in the Carter and Downing application referred to above, is illustrated in the following examples:

Example A

Seventy parts of cuprous chloride, 27.1 parts of ammonium chloride, 7 parts finely powdered copper, 1.75 parts concentrated (37%) hydrochloric acid and 30 parts of water are introduced in a horizontal copper tube of approximately twice the volume of the catalyst solution. This tube, whose length is approximately six times its diameter, is equipped with a horizontal agitator and so designed that it may be held at a constant temperature of from 45° to 100° C. The tube is heated to 50° to 60° C. and the catalyst solution aged for 24 hours under an atmosphere of nitrogen to insure that all of the copper is reduced to the cuprous state. This catalyst vessel is connected in series to a brine condenser held at 0 to 1° C., a separator capable of removing water from the gas stream (said water being returned to the catalyst tube), a condenser held at −60° to −70° C. by means of suitable refrigeration and a blower which returns the gas effluent from the condenser to the catalyst tube. The condenser is also connected with a still held at 0 to −5° C. from which vinylacetylene may pass into a storage tank at −15° C. and from which acetylene may be distilled thru a packed column, exhausting back into the acetylene-exit line from the condenser. After the catalyst solution has been aged, the system is swept with acetylene which is introduced thru a constant pressure device located at the blower. When the system is essentially free of nitrogen or other gases other than acetylene, agitation is started in the catalyst tube. Rapid absorption of the gas takes place; the blower is next put in operation. With a gas circulation rate of from 200 to 300 liters per minute considerable quantities of water are condensed in the preliminary cooler (0° to 1° C.) which is continuously returned to the catalyst; a very small quantity of liquid by-products also collects in this cooler, particularly at first; these are continuously removed. Vinylacetylene and ice, saturated with acetylene is collected in the condenser (held at −60 to −70° C.), the vinylacetylene passing into the still where it is held for nearly an hour, while the acetylene is allowed to distill off and return to the system. Vinylacetylene is then tapped off for storage. The effluent from the condenser returning with fresh acetylene to the blower. After several days of operation sufficient ice has collected in the low temperature condenser to necessitate a thaw. This is accomplished by shifting the condensation train to an auxiliary condenser, leaving the frozen condenser connected with the input end of the operating condenser in such a manner that the escaping gas will be subject to the usual condensation before returning to the blower. During the thawing operation, water is returned to the catalyst tube; also throughout the run, chlorine is determined daily on the vinylacetylene produced and the equivalent weight of hydrochloric acid is continuously added to the catalyst. In this manner, 96–100% of the weight of the acetylene consumed appears as vinylacetylene (crude); this crude vinylacetylene containing 80 to 100% vinylacetylene, 1 to 3% halogen derivatives and 0 to 20% of divinylacetylene. This crude vinylacetylene may be used as such or it may be purified by the simple process of fractional distillation.

*Example B*

The process of Example A is repeated but with the condensers replaced by an absorption tower held at −20° to 0° C. in which refined paraffin-base mineral oil is brought in contact with the gas stream by counter flow thru a packed column or tower, the rate of flow being adjusted so that the oil is nearly saturated with vinylacetylene by the time it reaches the bottom of the tower and the effluent gas contains only a small percentage of vinylacetylene. The oil is then circulated from the absorption tower to a suitable still in which the vinylacetylene is volatilized and the oil rendered applicable for further use.

*Example C*

The process of Example A is repeated but the blower is replaced by a rotary liquid sealed pump operating in saturated brine solution held at 0° C. and located ahead of the low temperature condensers in the gas circulation diagram. An orifice disk is placed in the system immediately following the condensers and is so regulated to maintain a pressure of one atmosphere on the condenser. With this pressure, the temperature of the condenser may be 10° higher than in Example A and the same yields will be obtained, and the product will be the same. During operation of the pump, the brine must be continuously concentrated to compensate for the moisture condensed therein.

*Example D*

The process of Example A is repeated using the same equipment except that the preliminary cooler of Example A is replaced with a brine spray chamber or brine absorption tower in which the gas stream is brought in contact with saturated salt solution at a temperature below 0° C. In this manner, moisture is removed from the gas to the limit of the vapor pressure of water from the saturated brine at the temperature of operation. The effluent gas is circulated directly to the vinylacetylene condenser and the product removed in the manner described in Example A.

*Objects of the invention*

It is one of the objects of this invention to prepare butadiene by means of a comparatively simple, economical and efficient procedure suitable for commercial application.

It is another object of the invention to effect the formation of butadiene at comparatively moderate temperatures, thereby avoiding excessive overheating with accompanying undesirable decomposition of the products of the reaction.

A more specific object relates to the production of butadiene from a cheaply and readily obtained raw material, namely, monovinylacetylene.

Other objects of the invention will become apparent from the following detailed description of the invention, and from the appended claims.

The present invention relates to the catalytic preparation of butadiene and involves the discovery that, when monovinylacetylene and hydrogen are brought in contact with a suitable hydrogenation catalyst which is preferably maintained at ordinary or slightly elevated temperatures, the hydrogen is caused to combine primarily with the triple bond of monovinylacetylene in the proper proportions to produce butadiene before extensive reduction takes place to more highly saturated hydrocarbons. This reaction may be illustrated as follows:

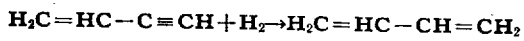

$$H_2C=HC-C\equiv CH + H_2 \rightarrow H_2C=HC-CH=CH_2$$

We have found that this hydrogenation may be carried out in any one of the following three ways: (1) Gaseous monovinylacetylene and hydrogen may be brought together and passed over the catalyst in the gaseous phase, or (2) Gaseous hydrogen may be brought into contact with a suspension of the catalyst in monovinylacetylene under suitable temperature and pressure, or (3) Finally, gaseous monovinylacetylene and hydrogen may be passed thru a suspension of the catalyst in a relatively non-volatile and inert liquid.

We have found that for the purpose of this invention, suitable hydrogenation catalysts may contain active nickel, cobalt, copper, platinum and palladium or mixtures of these metals with themselves or other metals such as iron, zinc, cadmium, chromium, silver, etc. Depending upon the method of operation, as will be illustrated below, colloidal or non-colloidal catalysts may be used. Colloidal catalysts are especially valuable in the case of palladium, and also platinum. The catalytic contact masses may be prepared in any suitable way and may be used alone, or supported on, or mixed with inert materials. Suitable promoters may be added to the catalytic masses for enhancing the catalytic properties of such masses. The methods of preparing such catalysts are well known, but simply for the purpose of reference, the following preparations are described.

*Catalyst A.*—Purified nickel nitrate is carefully ignited, gently at first and finally to a temperature of 350–400° C. until all of the oxides of nitrogen are driven off. Excessive heating should be avoided. The resulting nickel oxide is reduced in a stream of hydrogen at 300–350° C. and finally cooled and stored until used under hydrogen.

*Catalyst B.*—Pure nickel oxalate is ignited and reduced as described in the preparation of Catalyst A.

*Catalyst C.*—Pure cobalt carbonate is precipitated from an aqueous solution of a soluble cobalt salt containing suspended kieselguhr by means of ammonium carbonate. The kieselguhr containing cobalt carbonate is filtered off and washed completely free of water soluble material and is then dried, ignited and reduced as in the preparation of Catalyst A, above.

*Catalyst D.*—Pure nickel chromate is ignited and reduced.

*Catalyst E.*—One part of palladium chloride is dissolved in a small volume of water and hydrochloric acid; to this is added sufficient water, containing 0.06% of gelatin, to make 400–500 parts in all. At the time of use, this is reduced to a colloidal solution of palladium by means of hydrogen.

*Catalyst F.*—Chloroplatinic acid equavilent to one part of platinum is dissolved in water and added to 27 parts of sodium nitrate. This mixture is carefully ignited until all oxides of nitrogen have been expelled. The mass is then dissolved in water and the insoluble oxide of platinum washed free of soluble material. This when dried is reduced by hydrogen in the system and at the temperature in which it is to be used.

For purpose of illustration, the following examples explain the various methods of operation.

Example I

A catalyst such as Catalyst E (above) is prepared and cooled almost to freezing (approx. 1° C.) and to this is added 50 to 100 parts of liquid monovinylacetylene. This mixture is contained in a suitable vessel equipped to be violently stirred or shaken and held at constant temperature. The vessel is next swept with hydrogen until free from air, then the system is closed except for a line capable of admitting hydrogen under pressure up to 40 lbs. per sq. inch (absolute) and the agitation is started. The system is allowed to warm up to 15° C. and is held at this temperature, hydrogen being admitted at a pressure slightly in excess of the vapor pressure of the reaction mixture. After a short period during which the catalyst is reduced, reduction of the hydrocarbon begins and is allowed to continue until approximately 3.6 to 3.9 parts of hydrogen have been absorbed per 100 parts of monovinylacetylene originally present at which time the hydrogen supply is shut off and the hydrocarbon product distilled off of the aqueous catalyst mixture. The hydrogen and monovinylacetylene combine to form the butadiene which may be recovered from the effluent gases by any desired means.

Example II

The method of Example I may be repeated but the catalytic colloidal palladium may be prepared in 25 to 50% ethanol in water instead of water alone, thus giving an aqueous layer in which the monovinylacetylene is more soluble and hence more rapidly reduced.

Example III

A nickel catalyst such as described in Catalyst A (above) is placed in any suitable contact apparatus, and, while maintaining the catalyst at a temperature between 40 and 100° C., a reaction gas mixture is brought in contact therewith while maintaining a pressure up to 15 lbs./sq. in. (absolute) on the system. Such gas mixture contains hydrogen and monovinylacetylene in about proportions of 1:1 (by volume) and its passage through the contact apparatus is governed by an analysis of the emergent gases, care being taken to control the rate of flow to obtain the best conversion. The rate of flow will be proportional to the reaction rate of the conversion of monovinylacetylene to butadiene, the flow being regulated to effect an optimum conversion of the monovinylacetylene. Butadiene is recovered from the emergent gases and any unconverted material may be recycled for further conversion.

Example IV

Example III may be repeated using a catalyst such as described in Catalysts B, C, or D above.

Example V

One part of catalyst such as Catalyst F (above) is placed in 1500 parts of alcohol and after cooling to −10° C., 500 parts of monovinylacetylene are added and the system is placed under diminished pressure until the escaping monovinylacetylene has displaced all of the air. Hydrogen is then introduced to maintain a hydrogen pressure of from 40 to 100 lbs. per square inch (absolute) while the system is agitated and allowed to warm up to 15 to 40° C. When approximately 19 parts of hydrogen have been absorbed, the hydrogenation is discontinued and the product distilled out as in Example I.

Example VI

Example V may be repeated using acetic acid as a solvent in place of alcohol.

Example VII

Example V may be repeated using deca-hydronapthalene as solvent.

Example VIII

One part of catalyst such as Catalyst F (above) is suspended in 200 parts of deca-hydronapthalene at 50–80° C. A gas mixture containing approximately 1 volume of hydrogen and 1 volume of monovinylacetylene is passed thru this catalyst suspension maintaining a pressure on the entire system of between 0 and 15 lbs. sq. in. (absolute). At first a portion of the gas may be absorbed in the catalyst suspension but as soon as equilibrium is established the process may be operated at a uniform rate, the formation of butadiene taking place in the deca-hydronapthalene zone and it being subsequently removed from the effluent by any desired means. The unconverted monovinylacetylene and/or hydrogen may be recovered, and reused, as by recycling.

The catalytic hydrogenation of monovinylacetylene may be carried out at various pressures and temperatures. Pressures up to 300 lbs, per square inch (absolute) have been successfully used and as low as a few millimeters of mercury pressure (absolute). In cases such as Example I, II, V, VI and VII where liquid monovinylacetylene is hydrogenerated, the pressure on the system must exceed the vapor pressure of the monovinylactylene-catalyst mixture, of course; and in those cases where it is desired to carry out a vapor phase reaction (Examples III and IV) or a vapor-liquid reaction such as Example VIII, the pressure on the system must not be sufficient to liquefy the monovinylacetylene or butadiene. Broadly, pressures up to 300 lbs./sq. in. (absolute) have been used but we prefer the narrower limits of pressures between 0 and 30 lbs./sq. in. (absolute) for the vapor phase but between 15 to 100 lbs./sq. in. (absolute) for the liquid phase reactions. The butadiene forming reaction takes place at temperatures from about 0° to 400° C., although the lower temperatures decrease the reaction rate and the higher temperatures cause the formation of undesirable reaction and decomposition products, with corresponding decrease in yield of butadiene. Catalyst of nickel, cobalt, platinum and palladium can be readily prepared in an active state suitable for use at temperatures below 100° C. Less active catalysts require the higher temperatures, but in so far as possible we prefer to use catalyst of sufficient activity to allow the reaction to be carried out below 100° C. Frequently the catalyst tends to become hot due to the exothermic nature of the reaction. This may be controlled by means of suitable cooling coils or suitable heat exchange between the cold incoming gas and the hotter catalyst zone. To control the temperature in the gas phase reactions, it is sometimes convenient to dilute the reaction mixture with an inert gas such as water vapor or nitrogen. The addition of water vapor has the added advantage that it keeps the catalyst surface clean and in so doing increases the yield of butadiene.

As indicated in the example above liquid phase hydrogenation may be carried out in solvent for monovinylacetylene. For this purpose any unreducible liquid hydrocarbon or oxygen containing hydrocarbon derivative may be used. By "unreducible" we mean not capable of being reduced by hydrogen in the presence of the given catalyst at the desired temperature and pressure of the reaction, for example deca-hydronaphthalene, ethanol, methanol, cyclohexanol, cyclohexane, hexahydrotoluene, acetic acid, ethyl-acetate, etc. The solvents must be sulfur-free.

In the liquid phase reactions, violent agitation is advisable for successful operation. Also in the liquid phase reaction the relative quantity of solvent may be varied almost without limit, it sometimes being desirable to use no solvent at all. The quantity of catalyst used for a given quantity of monovinylacetylene is practically limited only by the amount necessary to complete the reaction in a convenient interval of time. Less than 2% of catalyst is usually used for economic reasons, though the catalyst may be used repeatedly before its activity becomes markedly decreased.

The ratio of hydrogen to monovinylacetylene in the gaseous phase reaction may also be varied over a comparatively wide range but we prefer to use approximately 1:1 or less. Butadiene is produced when the hydrogen ratio is in excess of this quantity but the process is less efficient. To prevent over reduction, it is frequently advantageous to operate with a lower hydrogen ratio than 1:1 and recover the unconverted monovinylacetylene, returning it to the catalyst for further reaction with more hydrogen, thus operating a recirculating stream of monovinylacetylene in which a limited fraction is converted on each cycle through the catalyst and removed. This process may be made continuous by continuously passing hydrogen and monovinylacetylene through the catalytic zone in the proper proportions, while recycling any unused monovinylacetylene and hydrogen, allowance being made for the recycled material by regulating the proportions of added hydrogen and monovinylacetylene in accordance with the amount and character of the material being returned to the catalytic zone for reconversion.

The gaseous hydrogen and monovinylacetylene may be purified when necessary to avoid catalyst poisoning.

The reaction is carried out preferably under non-oxidizing conditions, removal of air from the zone of reaction being specified in several of the examples illustrating the adaptation of the process.

The butadiene prepared according to the present process is capable of utilization in any of the well known ways, and is particularly valuable for use in the manufacture of synthetic rubber. The present process is well adapted for commercial application, and is highly valuable for this reason.

It will be understood that the specific embodiments of the invention described above are given by way of illustration only, and are capable of variation within wide limits without departing from the spirit and scope of the invention.

We claim:
1. The process which comprises reacting monovinylacetylene and hydrogen in the presence of a hydrogenating catalyst.
2. The process which comprises reacting monovinylacetylene and hydrogen in the presence of a hydrogenating catalyst under non-oxidizing conditions.
3. The process which comprises reacting hydrogen with gaseous monovinylacetylene in the presence of a hydrogenating catalyst.
4. The process which comprises reacting hydrogen with liquid monovinylacetylene in the presence of a hydrogenating catalyst.
5. The process which comprises reacting hydrogen with monovinylacetylene in the presence of a solvent for the latter and in the presence of a hydrogenating catalyst.
6. A process for preparing butadiene which comprises reacting gaseous monovinylacetylene with substantially an equimolecular proportion of hydrogen in the presence of a hydrogenating catalyst.
7. The process which comprises reacting gaseous monovinylacetylene with hydrogen in a reaction zone in the presence of a hydrogenating catalyst to form butadiene, removing the reacted mixture, recovering butadiene therefrom, and returning unconverted monovinylacetylene to the reaction zone for further conversion.
8. A process for preparing butadiene which comprises reacting monovinylacetylene with hydrogen in the presence of a hydrogenating catalyst and under a pressure not substantially in excess of 300 lbs./sq. in.
9. A process for preparing butadiene which comprises reacting monovinylacetylene with hydrogen in the presence of a hydrogenating catalyst and at a temperature not substantially in excess of 400° C. (absolute).
10. A process for preparing a gaseous mixture of hydrogen and monovinylacetylene in proportions of approximately 1:1, passing the gaseous mixture in contact with a hydrogenating catalyst at a rate of flow proportioned to the rate of the reaction:

$$H_2C=HC-C\equiv CH + H_2 \rightarrow H_2C=HC-CH=CH_2$$

withdrawing the reacted mixture, and recovering butadiene therefrom.
11. The process described in claim 10 in which the reaction temperature is maintained between 40° C. and 100° C.
12. The process described in claim 10 in which the reaction pressure does not exceed 30 lbs./sq. in. (absolute).
13. A process for preparing butadiene which comprises preparing a gaseous mixture of hydrogen and monovinylacetylene in proportions of approximately 1:1, passing the gaseous mixture through a liquid suspension of a hydrogenating catalyst at a rate of flow proportioned to the rate of the reaction:

$$H_2C=HC-C\equiv CH + H_2 \rightarrow H_2C=HC-CH=CH_2$$

withdrawing the reacted mixture, and recovering butadiene therefrom.
14. A process for preparing butadiene which comprises thoroughly commingling liquid monovinylacetylene and a hydrogenating catalyst, contacting hydrogen with the mixture and maintaining such contact until a predetermined amount of hydrogen is absorbed whereby conversion of monovinylacetylene to butadiene is effected by reaction with hydrogen.

15. The process described in claim 14 in which the liquid-catalyst mixture is continuously agitated throughout the period of reaction.

16. The process described in claim 14 in which the reaction pressure is maintained between the limits 15 lbs. and 100 lbs. per sq. in. (absolute).

17. A process for preparing butadiene which comprises contacting hydrogen and liquid monovinylacetylene in the presence of a hydrogenating catalyst, and maintaining such contact until from 3.6 to 3.9 parts of hydrogen have been absorbed per 100 parts of monovinylacetylene originally present.

18. The process which comprises continuously passing hydrogen in contact with monovinylacetylene at a temperature of from 0 to 100° C. and in the presence of a hydrogenating catalyst, the pressure being maintained above that pressure at which butadiene will liquefy, and continuously withdrawing the butadiene at a rate proportioned to the rate of the reaction:

$$H_2C=HC-C \equiv CH + H_2 \rightarrow H_2C=HC-CH=CH_2$$

19. The process of claim 18 carried out in the presence of a solvent for monovinylacetylene.

20. The process of claim 18 carried out in the presence of an organic solvent which is inert under the conditions of the reaction.

WILLIAM S. CALCOTT.
ALBERT S. CARTER.
FREDERICK B. DOWNING.

CERTIFICATE OF CORRECTION.

Patent No. 1,920,242.  August 1, 1933.

WILLIAM S. CALCOTT, ET AL.

It is hereby certified that error appears in the printed specification of the above numbered patent requiring correction as follows: Page 1, lines 45 and 46, strike out the words "Patent No. 1,876,857, filed September 1, 1928" and insert instead Serial No. 538,920, filed May 21, 1931; and that the said Letters Patent should be read with this correction therein that the same may conform to the record of the case in the Patent Office.

Signed and sealed this 24th day of April, A. D. 1934.

Bryan M. Battey (Seal)  Acting Commissioner of Patents.

15. The process described in claim 14 in which the liquid-catalyst mixture is continuously agitated throughout the period of reaction.

16. The process described in claim 14 in which the reaction pressure is maintained between the limits 15 lbs. and 100 lbs. per sq. in. (absolute).

17. A process for preparing butadiene which comprises contacting hydrogen and liquid monovinylacetylene in the presence of a hydrogenating catalyst, and maintaining such contact until from 3.6 to 3.9 parts of hydrogen have been absorbed per 100 parts of monovinylacetylene originally present.

18. The process which comprises continuously passing hydrogen in contact with monovinylacetylene at a temperature of from 0 to 100° C. and in the presence of a hydrogenating catalyst, the pressure being maintained above that pressure at which butadiene will liquefy, and continuously withdrawing the butadiene at a rate proportioned to the rate of the reaction:

$$H_2C=HC-C\equiv CH + H_2 \rightarrow H_2C=HC-CH=CH_2$$

19. The process of claim 18 carried out in the presence of a solvent for monovinylacetylene.

20. The process of claim 18 carried out in the presence of an organic solvent which is inert under the conditions of the reaction.

WILLIAM S. CALCOTT.
ALBERT S. CARTER.
FREDERICK B. DOWNING.

CERTIFICATE OF CORRECTION.

Patent No. 1,920,242.   August 1, 1933.

WILLIAM S. CALCOTT, ET AL.

It is hereby certified that error appears in the printed specification of the above numbered patent requiring correction as follows: Page 1, lines 45 and 46, strike out the words "Patent No. 1,876,857, filed September 1, 1928" and insert instead Serial No. 538,920, filed May 21, 1931; and that the said Letters Patent should be read with this correction therein that the same may conform to the record of the case in the Patent Office.

Signed and sealed this 24th day of April, A. D. 1934.

Bryan M. Battey (Seal)   Acting Commissioner of Patents.

CERTIFICATE OF CORRECTION.

Patent No. 1,920,242. August 1, 1933.

WILLIAM S. CALCOTT, ET AL.

It is hereby certified that error appears in the printed specification of the above numbered patent requiring correction as follows: Page 1, lines 45 and 46, strike out the words "Patent No. 1,876,857, filed September 1, 1928" and insert instead Serial No. 538,920, filed May 21, 1931; and that the said Letters Patent should be read with this correction therein that the same may conform to the record of the case in the Patent Office.

Signed and sealed this 24th day of April, A. D. 1934.

Bryan M. Battey (Seal) Acting Commissioner of Patents.